United States Patent [19]

Yamaki

[11] 4,371,935
[45] Feb. 1, 1983

[54] NAVIGATION INSTRUMENT

[75] Inventor: Kiyoshi Yamaki, Yokohama, Japan

[73] Assignee: Nissan Motor Company, Limited, Yokohama, Japan

[21] Appl. No.: 214,237

[22] Filed: Dec. 8, 1980

Related U.S. Application Data

[63] Continuation of Ser. No. 58,770, Jul. 19, 1979, abandoned.

[30] Foreign Application Priority Data

Sep. 29, 1978 [JP] Japan ............................... 53-119963

[51] Int. Cl.³ ............................................. G06F 15/50
[52] U.S. Cl. ............................. 364/424; 235/92 DN; 364/561; 364/565
[58] Field of Search ............... 364/424, 436, 438, 442, 364/446, 561, 565; 340/52 R, 54; 235/92 DN, 92 TC; 324/160

[56] References Cited

U.S. PATENT DOCUMENTS

| | | | |
|---|---|---|---|
| 3,780,272 | 12/1973 | Rohner | 364/424 |
| 3,885,137 | 5/1975 | Ooya et al. | 364/565 |
| 3,892,952 | 7/1975 | Shibata et al. | 364/424 |
| 4,317,106 | 2/1982 | Hüber | 364/424 |

OTHER PUBLICATIONS

Ludvigsen, "Cadillac's Cockpit Copilot", Motor Trend, Oct. 1977, vol. 29, No. 10, pp. 106–107.

*Primary Examiner*—Errol A. Krass
*Attorney, Agent, or Firm*—Lane, Aitken, Kice & Kananen

[57] ABSTRACT

A navigation instrument for use with a roadway vehicle to calculate and display the average speed of the vehicle and the deviations of the travelling distance and time of the vehicle from scheduled ones in accordance with the travelling distance and time and a scheduled vehicle average speed. The calculated results are not displayed and instead a zero-flashing or blanking indication is made to prevent the driver from having any unreliable information during the initial running operation of the vehicle.

18 Claims, 10 Drawing Figures

NAVIGATION INSTRUMENT

This is a continuation of application Ser. No. 58,770, filed July 19, 1979, now abandoned.

BACKGROUND OF THE INVENTION

1. Field of the Invention

This invention relates to a navigation instrument for use with roadway vehicles such as rally cars, autobuses and trucks operated on a regular run, and so forth.

2. Description of the Prior Art

Navigation instruments have been incorporated in roadway vehicles for calculating the displaying vehicle running conditions with respect to scheduled ones so that the driver can arrive at the destination on time.

Typical conventional navigation instruments comprise a pulse generator providing a pulse every time the vehicle travels a constant distance, a first counter counting the pulses fed from the pulse generator, a clock pulse generator, a second counter counting the clock pulses fed from the clock pulse generator, an arithmetic circuit calculating the average speed of the vehicle, the deviation of the travelling distance from a scheduled distance, and the deviation of the travelling time from a scheduled time in accordance with the contents of the first and second counters and a scheduled average speed, and a display control circuit responsive to the calculated results to drive a display unit so that the calculated results can sequentially be displayed on the display unit.

With such conventional navigation instruments, however, the possibility exists that the reliability of the contents displayed on the display unit may be low during the initial running operation of the vehicle. There are several reasons for such lack of reliability. First, since the clock pulse generator is designed to generate clock pulses at an interval increasing with the vehicle speed decreasing so as to meet the counting capacity of the counter at high vehicle speeds, the number of the pulses fed from the pulse generator is fewer with respect to the time interval of the pulses fed from the clock pulse generator during the initial running operation of the vehicle. This results in counting accuracy reduction. Second, the first and second counters are actuated at a desired time. If they are actuated at a time after the clock pulse generator provides one clock pulse and before it provides the next clock pulse, an error will be introduced in the data calculation performed during the time interval.

An attempt has been made to provide a zero-flashing or blanking indication for a predetermined time after the vehicle starts so as to serve notice on the driver that the accuracy of the contents to be displayed is insufficient. However, the possibility still exists that a great error is introduced in the displayed results if the vehicle is started with intermittent operations.

SUMMARY OF THE INVENTION

It is therefore one object of the present invention to provide an improved navigation instrument which will be free from the above mentioned disadvantages found in conventional navigation instruments.

Another object of the present invention is to provide a navigation instrument in which a zero-flashing or blanking indication is made until a vehicle travels a predetermined distance from a starting point so as to prevent the driver from having any unreliable information during the initial running operation of the vehicle.

Still another object of the present invention is to provide a navigation instrument in which a normal data indication is made after the travelling distance of the vehicle exceeds a predetermined level.

According to the present invention, these and other objects are accomplished by a navigation instrument for a roadway vehicle, comprising distance detector means for providing a signal representative of the distance of travel of the vehicle from a starting point, time detector means for providing a signal representative of the length of time it takes the vehicle to travel the distance, speed setting means for providing a signal representative of a scheduled average speed, arithmetic means responsive to the vehicle travelling distance and time representative signals and the scheduled average speed representative signal for providing three data signals representative of the average speed of the vehicle, the deviation of the travelling distance from a scheduled one, and the deviation of the travelling time from a scheduled one, signal generator means for providing a data-unavailability indicative signal, control means responsive to at least one vehicle running parameter for providing a first control signal when the value of the parameter is lower than a predetermined level and a second control signal when it is higher than the predetermined level, signal selector means responsive to the first signal for passing the data-unavailability indicative signal and responsive to the second control signal for sequentially passing the data signals fed thereto from the arithmetic means, and display means responsive to each signal applied thereto from the signal selector means for displaying the content represented by the signal.

Other objects, means, and advantages of the present invention will become apparent to one skilled in the art thereof from the following description.

BRIEF DESCRIPTION OF THE DRAWINGS

The following explanation of several preferred embodiments of the present invention will help in the understanding thereof, when taken in conjunction with the accompanying drawings, which, however, should not be taken as limiting the present invention in any way, but which are given for purposes of illustration only. In the drawings, like parts are denoted by like reference numerals in the several figures, and.

DESCRIPTION OF THE PREFERRED EMBODIMENTS

Figure 1:
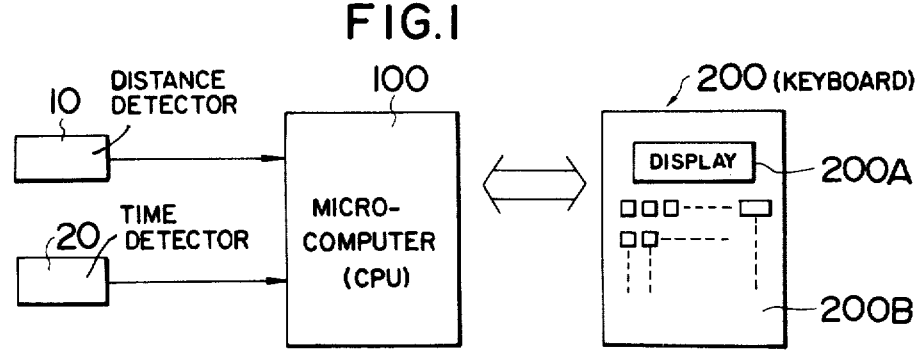
FIG. 1 is a block diagram briefly illustrating the basic structure of the navigation instrument of the present invention.

Referring first to FIG. 1, there is briefly shown in block diagram form one embodiment of a navigation instrument made in accordance with the present invention. The navigation instrument comprises a distance detector 10 for detecting the distance of travel of a vehicle from a starting point, a time detector 20 for detecting the length of time it takes the vehicle to travel the distance, and a microcomputer 100 including a central processing unit (CPU) for calculating the average speed of the vehicle, the deviation of the detected travelling distance from a scheduled distance, and the deviation of the detected travelling time from a scheduled time according to the detected travelling distance and time and a scheduled average speed and storing the calculated results therein.

The navigation instrument also comprises a keyboard 200 including a display unit 200A and a keyboard switch unit 200B for use in writing and reading data out of a memory (not shown) included in the microcomputer 100 so that the data calculated in the microcomputer 100 in accordance with the inputted information is displayed on the display unit 200A.

Figure 2:
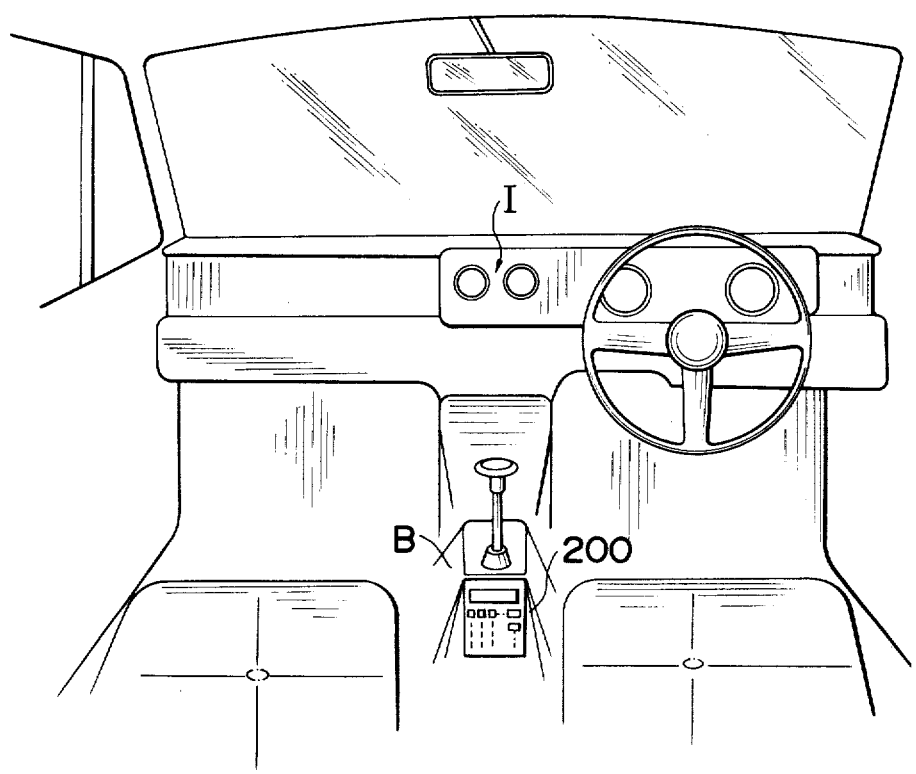
FIG. 2 is a perspective view illustrating the keyboard placed on the console box of a vehicle.

As shown in FIG. 2, the keyboard 200 may be placed on the console box B of the vehicle or any other suitable position convenient for the driver to operate it. The display unit 200A may be separated from the keyboard 200 and placed on the instrument panel of the vehicle or any other suitable position convenient for the driver to view it. The microcomputer 100 may be placed on the rear surface of the keyboard 200 or any other suitable position.

Figure 3:
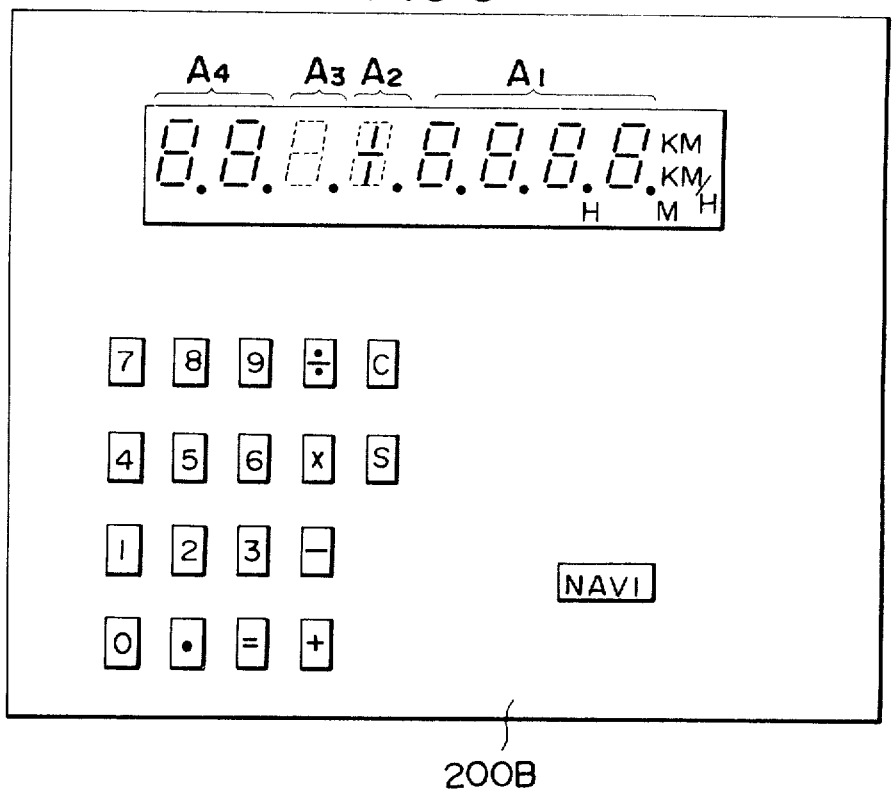
FIG. 3 is a plan view of the display unit included in the keyboard.

The keyboard 200 will be described in greater detail with reference to FIG. 3. The display unit 200 is shown as comprised of 7-segment digit indicator tubes (digitrons). The first four-figure section A1 is for indication of the calculated data, and the second one-figure section A2 is for indication of the symbol + or − when the magnitude of the data displayed on the first section A1 is larger or smaller than that of a corresponding scheduled data. The section A3 next to the section A2 is blanked and the last two-figure section A4 is for indication of a scheduled average vehicle speed. The key switch unit 200B has thereon a navigation instrument function key "NAVI", digit keys "0" to "9", an indication cancelling key "C", and a set/start key "S". Unit indication lamps are designated by the letters "KM", "KM/H", "H", and "M" which light in accordance with the dimension of each displayed data for indicating that the data are displayed in kilometers, kilometers per hour, hour and minute, respectively.

Figure 4:
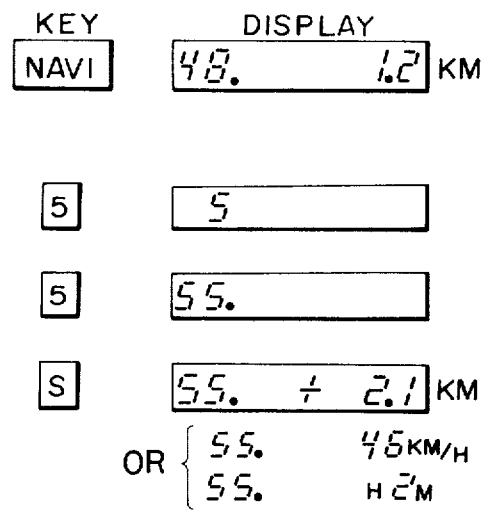
FIG. 4 is a diagram used in explaining a data inputting procedure.

The procedure of the keyboard 200 will be described with reference to FIG. 4. For sake of an example, it will be assumed that an average speed of 48 km/h was previously set and another average speed of 55 km/h is required to be set. First, the function key "NAVI" is depressed to clear the previous data and place the navigation instrument on standby. The digit key "5" is then depressed to display a digit "5" on the first place of the two-figure section A4 and subsequently the digit key "5" is depressed again to display a digit "55" on the section A4. When the set/start key "S" is depressed after the average speed is newly set, calculations are performed in the microcomputer 100 on each occasion with respect to the newly scheduled average speed of 55 km/h and the calculated results such as a travelling distance deviation (+2.1 km/h in the illustrated case), an average vehicle speed (46 km/h in the illustrated case), and a travelling time deviation (2 minutes in the illustrated case) are sequentially displayed at a predetermined interval.

Figure 5:
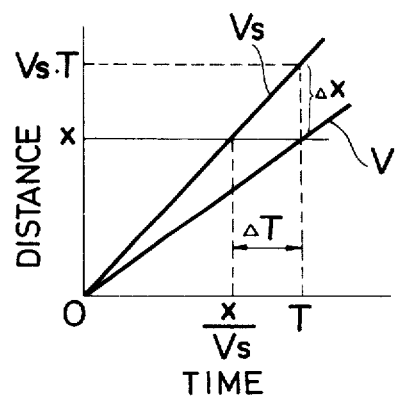
FIG. 5 is a graph of vehicle travelling time versus vehicle travelling distance used to explain the data calculation performed in the arithmetic circuit.

Prior to the detailed description of the preferred embodiments of the present invention, explanation will be made of the calculation of the average speed of the vehicle, and the travelling distance and time deviations according to a scheduled average vehicle speed, and the detected travelling distance and time with reference to FIG. 5. Assuming that X is the distance of travel of the vehicle at a time T, ΔX is the deviation of the travelling distance X from a scheduled travelling distance, and ΔT is the deviation of the travelling time T from a scheduled time, the travelling average speed V and the travelling distance and time deviations X and T are expressed as:

$$V = X/T \quad (1)$$

$$\Delta X = V_s \cdot T - X \quad (2)$$

$$\Delta T = T - X/V_s = \Delta X/V_s \quad (3)$$

were Vs is a scheduled average speed.

Figure 6:
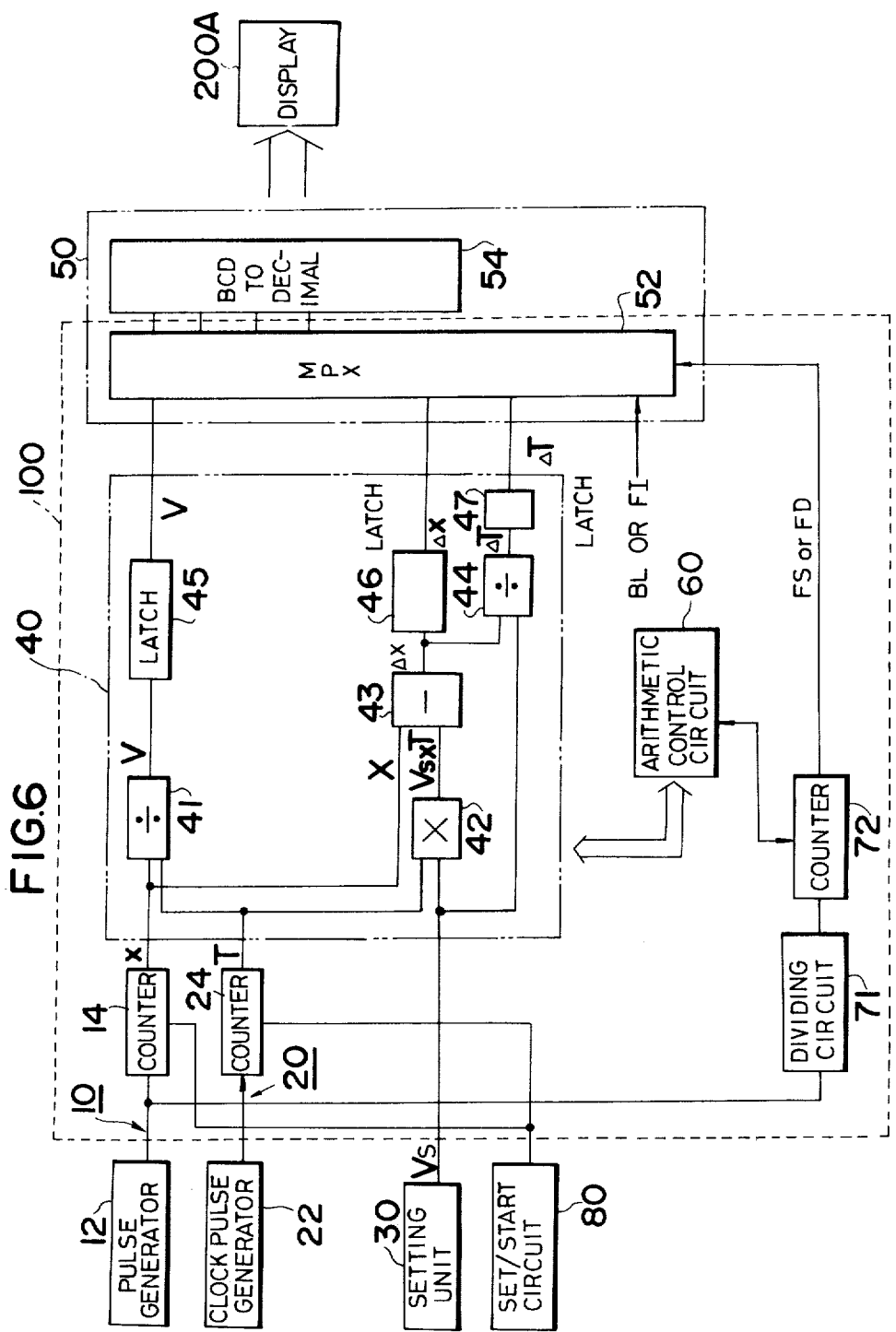
FIG. 6 is a block diagram illustrating one embodiment of the navigation instrument of the present invention.

Referring to FIG. 6, there is illustrated in more detail one embodiment of the present invention. The distance detector 10 includes a pulse generator 12 for providing a pulse every time the vehicle travels a constant distance and a first counter 14 for counting the pulses fed thereto from the pulse generator 12. The time detector 20 includes a clock pulse generator 22 including a crystal oscillator and a second counter for counting the clock pulses fed thereto from the clock pulse generator 22. A scheduled speed setting unit 30 is provided for use in setting a scheduled average speed Vs. The outputs of the distance detector 10, the time detector 20, and the speed setting unit 30 are coupled to an arithmetic unit 40. The arithmetic unit 40 comprises a first divider 41 for dividing the output (travelling distance X) from the first counter 14 by the output (travelling time T) from the second counter 24 to provide a vehicle average speed V, a multiplier 42 for multiplying the output T from the second counter 24 by the output (scheduled vehicle speed Vs) from the speed setting unit 30 to provide a scheduled travelling distance Vs·T, a subtractor 43 for substacting the output X of the first counter 14 from the output Vs·T of the multipler 42 to provide a travelling distance deviation ΔX = Vs·T − X, a second divider 44 for dividing the output ΔX of the subtractor 43 by the output Vs of the speed setting unit 30 to provide a travelling time deviation ΔT = ΔX/Vs, and latch circuits 45, 46 and 47 for temporarily storing the outputs V, ΔX and ΔT from the arithmetic circuits 41, 43 and 44, respectively.

The contents of the latch circuits 45, 46, 47 are fed to a display control unit 50 which comprises a multiplexer 52 serving as a data selector for sequentially selecting the binary coded decimal (BCD) data signal fed thereto from the latch circuits 45, 46 and 47, and a decoder/driver 54 for converting the selected BCD data signals into decimal data signals to drive defined digit indicator tubes of the display unit 200A. The timing of an arithmetic operation of each arithmetic circuit and the timing of operation of each latch circuit are controlled by an arithmetic control circuit 60.

The output of the pulse generator 12 is also applied to a dividing circuit 71 where it is counted down at a dividing ratio and the output of the dividing circuit 71 is then fed to a third counter 72 which counts it to provide a carrier signal Fd when counting up. The operation of the third counter 72 is monitored by the arithmetic control circuit 60 such that it is placed in operation in presence of a predetermined output corresponding to the travelling distance detected in the distance detector or a predetermined result calculated in the arithmetic unit. The reason for this is that is of no use to count the pulses from the pulse generator 12 and provide a carry signal if the distance detector 10 is defective.

A zero-flashing signal FI is applied to the multiplexer 52 which selects the signal FI until the third counter 72 counts up to provide a data select signal Fd to the multiplexer 52, thereby causing the decoder/driver 54 to drive defined digit indicator tubes of the display unit 200A at a relatively short interval such as one less than 0.5 second so that the defined digits "0" appear to be flashing. Instead of the zero-flashing signal FI, a blanking signal BL may be applied to the multiplexer 52, in which case, the multiplexer 52 prohibits the decoding function of the decoder/driver 54 so that no indication appears on the display unit 200A until the third counter 72 counts up to provide a data select signal Fd to the multiplexer 52.

The operation of the present invention will now be described. The driver operates the function key "NAVI" to place the navigation instrument on standby, operating some digit keys to set a scheduled average speed, for example, of 50 km/h in the speed setting unit 30, and operating a set/start circuit 80 to release the reset states of the first and second counters 14 and 24. The divider 41 divides the content X of the first counter 14 by the content T of the second counter 24 to provide an average vehicle speed X/T which is stored in the latch circuit 45. The multiplier 42 multiplies the output Vs of the speed setting unit 30 by the content T of the second counter 24 to provide a scheduled travelling distance Vs·T which is applied to the subtractor 43. The subtractor 43 subtracts the content X of the first counter 14 from the output Vs·T of the multiplier 42 to provide a travelling distance deviation $\Delta X = Vs \cdot T - X$ which is stored in the latch circuit 46. The second divider 44 divides the output $\Delta X$ of the subtractor 43 by the output Vs of the vehicle speed setting unit 30 to provide a travelling time deviation $\Delta T$ which is stored in the latch circuit 47. The arithmetic control circuit 60 starts the counting operation of the third counter 72.

Assuming now that X' and T' are the travelling distance and time to be displayed, respectively, and x and t are the travelling distance and time represented by unit pulse, respectively, the following relations are obtained:

$$X \simeq X' = m \cdot x \tag{4}$$

$$T \simeq T' = n \cdot t \tag{5}$$

where m is the number of pulses generated from the distance pulse generator in unit time and n is the number of pulses generated from the clock pulse generator in unit time.

Thus, the average speed V' to be displayed, the travelling distance deviation $\Delta X'$ to be displayed, and the travelling time deviation $\Delta T'$ to be displayed are $$V' = X'/T' = m \cdot x / n \cdot t \tag{6}$$

$$\Delta X' = Vs \cdot T' - X' \tag{7}$$
$$= Vs \cdot (n \cdot t) - (m \cdot x)$$

$$\Delta T' = T' - X'/Vs \tag{8}$$
$$= n \cdot t - m \cdot x/Vs$$

Since generally, $n \gg m$, the accuracy of the data to be displayed is dependent on X' (or m). For example, assuming T = T' the error E in average speed is given by $$E = \frac{V - V'}{V'} = \frac{X/T - X'/T}{X'/T}$$

$$\approx \frac{X - X'}{X'} \leq x/m \cdot x = 1/m$$

$$(\because m \cdot x \leq X < (m + 1) \cdot x)$$

Accordingly, if the data indication is changed from its zero-flashing or blanking indication mode to its normal data indication mode after the vehicle travels a distance $X = 100 \cdot x(m = 100)$, the calculated results can be displayed with accuracies better than 1%.

Figure 7:
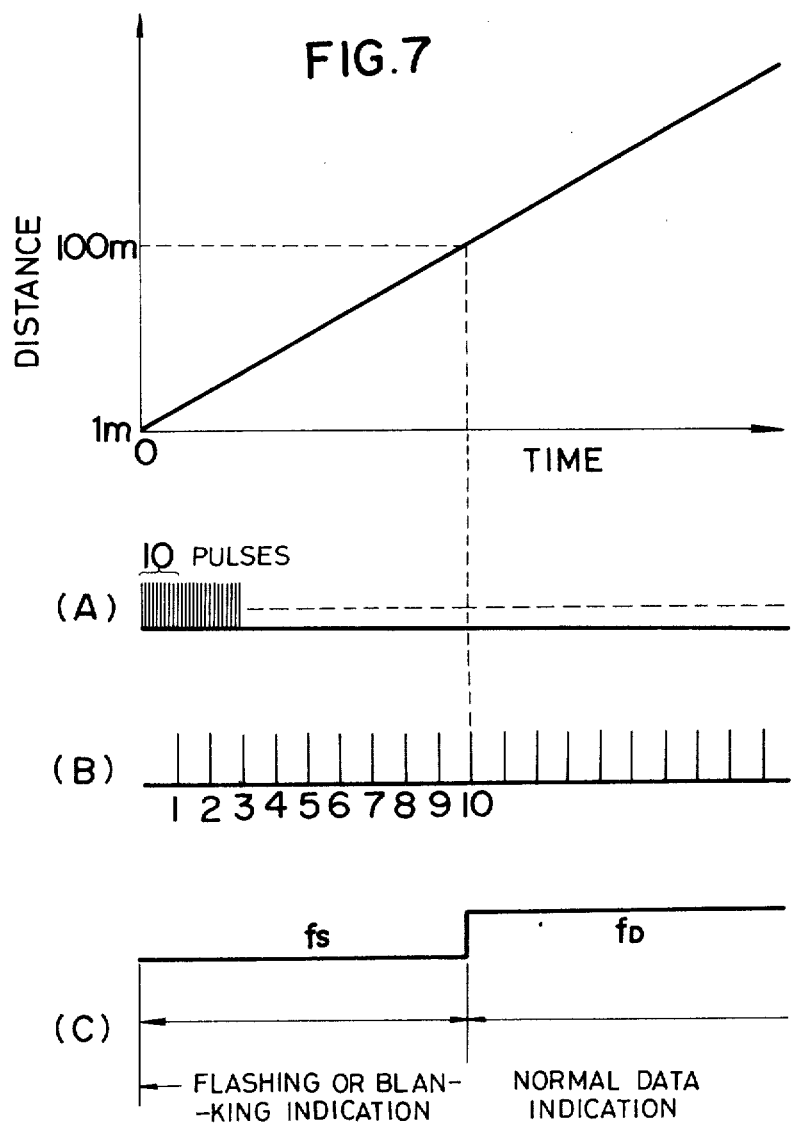
FIG. 7 is a diagram showing the timing of occurrence of the pulse generator output (a), first dividing circuit output (b), and third counter output (c)

This will be explained in more detail with reference to FIG. 7. For example, assuming that the reliability of the data to be displayed is insufficient until the vehicle travels a distance of 100 meters, the third counter 72 is a decimal counter, the dividing circuit 71 has a dividing ratio of 10, and the pulse generator 12 produces a pulse every time the vehicle travels a distance of 1 meter, the dividing circuit 71 produces a carrier pulse every time the vehicle travels a distance of 10 meters and the third counter 72 has its output changed to the high level to provide a data select signal Fd when counting 10 carrier pulses fed thereto from the dividing circuit 71.

Figure 9:
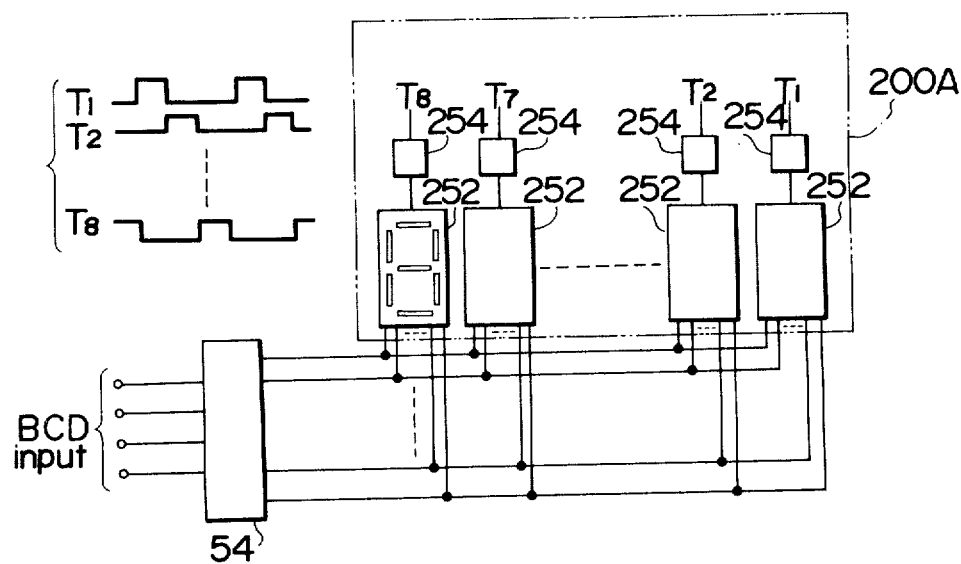
FIG. 9 is a diagram illustrating the detailed structure of the display unit.

Before the vehicle travels a distance of 100 meters, the third counter 72 has its output held at the low level to provide a data prohibit signal Fs to the multiplexer 52, which passes a zero-flashing or blanking signal FI or BL to the decoder/driver 54 so as to make a zero-flashing or blanking indication on the display unit 200A. If a zero-flashing signal FI is applied through the multiplexer 52 to the decoder/driver 54, the decoder/driver 54 converts the BCD code signal to a decimal code signal to drive the defined segments of 8-figure digit indicator tubes 252 as shown in FIG. 9 so as to display a flashing number "00000000" on the display unit 200A. If it is desired to zero-flash only the first four-figure digit indicator tubes included in the section A1 (FIG. 3), a predetermined number of drive pulses T1 to T8 may be used to drive the first four figure drivers 254.

If a blanking signal BL is applied through the multiplexer 52 to the blanking input terminal (not shown) of the decoder/driver 54, the decoder/driver 54 decodes it to hold the digit indicator tubes lighted out or blanked. Although a dynamic display is used in the above embodiment to facilitate driving of the multi-figure digit indicator tubes, it is to be noted that any other suitable display unit and digit indicator tube may be used.

In the above embodiment, a zero-flashing or blanking indication is made until the vehicle travels a predetermined distance from a starting point to prevent the driver from having any unreliable information during the initial running operation of the vehicle. After the vehicle travels a predetermined distance, the third counter 72 has its output changed to the high level to provide a data selection signal Fd so as to cause the multiplexer 52 to sequentially select the calculated data signals V, X and T fed from the arithmetic unit 40. At this time, the latch circuits 45, 46 and 47 are reset in accordance with commands applied thereto from the arithmetic control circuit 60. When the data selection signal Fd is applied to the multiplexer 52, the calculated results are sequentially fed through the multiplexer 52 to the decoder/driver 44 which converts them into decimal segment drive code signals to drive defined digit indicator tubes.

Figure 8:
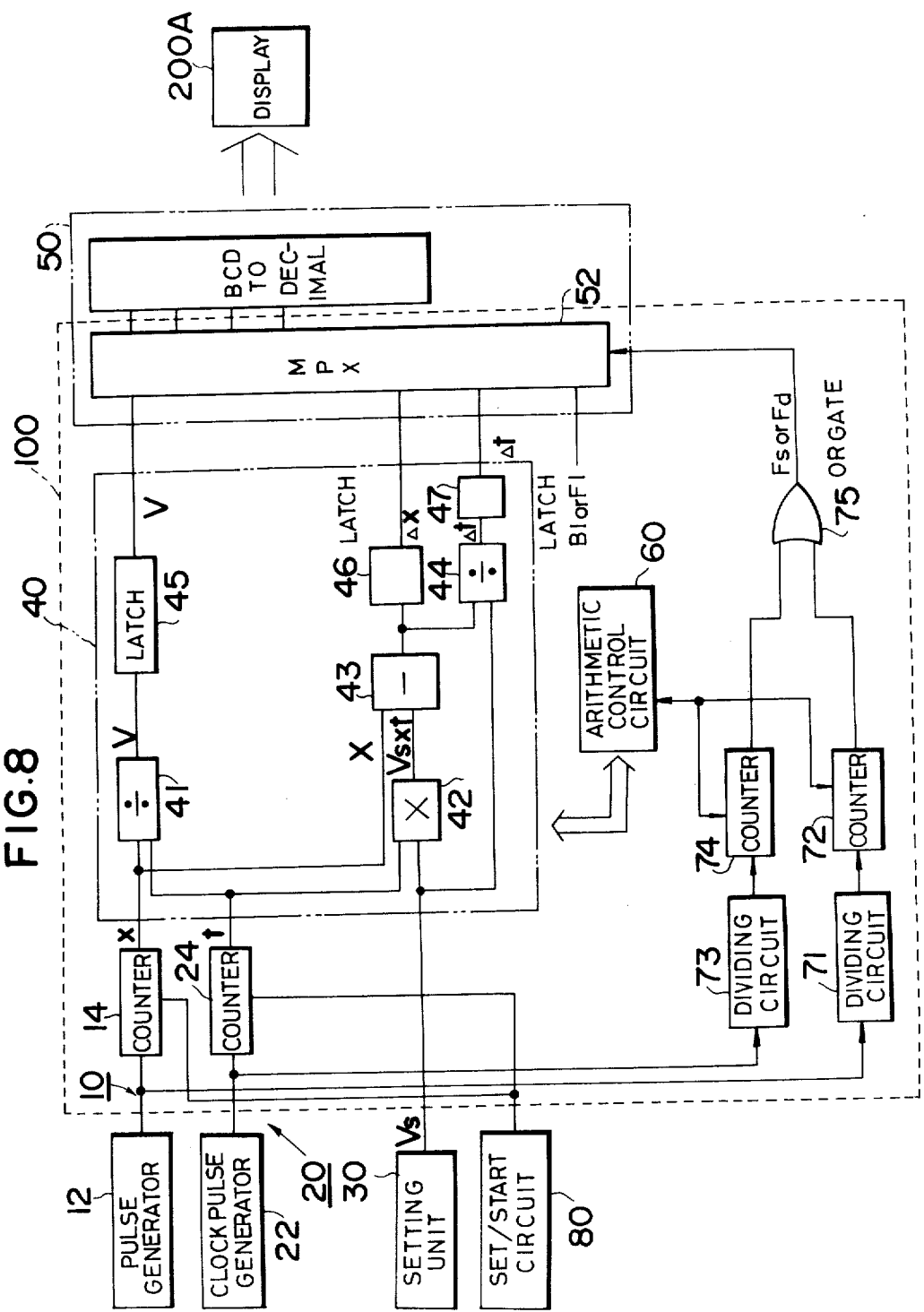
FIG. 8 is a block diagram illustrating a second embodiment of the present invention.

Referring to FIG. 8, there is illustrated a second embodiment of the present invention which is basically similar to that described with relation to FIG. 6 except that a second dividing circuit 73, a fourth counter 74, and an OR gate 75 are further provided. The output of the clock pulse generator 22 is coupled to the second dividing circuit 73 where it is counted down and the output of the dividing circuit 73 is then fed to the fourth counter 74 where it is counted. The output of the fourth counter 74 and the third counter 72 are applied to the OR gate 75, the output of which is coupled to the multiplexer 52. The counting operations of the third and fourth counters 72 and 74 are monitored by the arithmetic control circuit 60.

The output of the fourth counter 74 is held at its low level until the vehicle travels for a predetermined time after starting at a starting point and the output of the third counter 72 is held at its low level until the vehicle travels a predetermined distance from the starting point. At this time, the OR gate 75 has its output held at its low level to provide a data prohibit signal Fs to the multiplexer 52 so as to make a flashing or blanking indication on the display unit 200A. After the vehicle travels for a predetermined time or after it travels a predetermined distance, the fourth or third counter 74 or 72 has its output changed to its high level and the OR gate 75 has its output changed to its high level to provide a data selection signal Fd to the multiplexer 52 so as to make a normal data indication on the display unit 200A.

Figure 10:
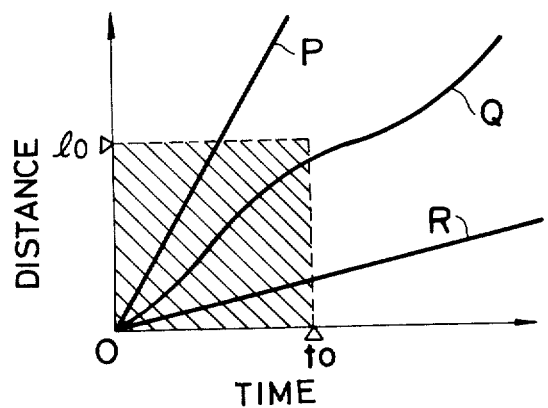
FIG. 10 is a graph of vehicle travelling time versus vehicle running distance used to explain the operation of the navigation instrument of FIG. 8.

In FIG. 10, the hatched area indicates the range where a flashing or blanking indication is made on the display unit 200A. If the vehicle travels in a manner as shown by the line P, a normal data indication is made after the distance of travel of the vehicle exceeds a predetermined distance lo. If the vehicle travels in a fashion as shown by the line Q or R, a normal data indication is made after the vehicle travels for a predetermined time $t_o$.

In the above embodiment, a normal data indication is made after travelling distance or time of the vehicle exceeds a predetermined level. This means that a normal data indication is made after the vehicle travels for a predetermined time ven if it is stopped or runs at low speeds after staring from a starting point.

Although a microcomputer is used in the above embodiments, it is to be noted that any other suitable circuit may be used in view of requirements for arithmetic accuracy and limitation on hardware structure. Further, any other suitable indication such as a bar indication "- - -" may be made to provide the driver an information that the data to be displayed are unreliable.

While the present invention has been shown and described with reference to some preferred embodiments thereof, and with reference to the drawings, it should be understood that various changes and modifications may be made to the form and the detail thereof, by one skilled in the art, without departing from the scope of the present invention. Therefore, it should be understood by all those whom it may concern that the shown embodiments, and the drawings, have been given for the purposes of illustration only, and are not intended to limit the scope of the present invention, or of the protection sought to be granted by Letters Patent, which are solely to be defined by the accompanying Claims.

What is claimed is:

1. A navigation instrument for use with a roadway vehicle, comprising:
    (a) distance detector means for providing a signal representative of the distance of travel of the vehicle from a starting point;
    (b) time detector means for providing a signal representative of the length of time it takes the vehicle to travel said distance;
    (c) speed setting means for providing a signal representative of a scheduled average speed;
    (d) arithmetic means responsive to said vehicle travelling distance and time representative signals and said scheduled average speed representative signal for providing three data signals representative of the average speed of the vehicle, the deviation of travelling distance from a scheduled one, and the deviation of the travelling time from a scheduled one;
    (e) signal generator means for providing a data-unavailability indicative signal;
    (f) control means responsive to said vehicle travelling distance representative signal from said distance detector for providing a first control signal when the vehicle travelling distance is shorter than a predetermined level and a second control signal when it is longer than said predetermined level;
    (g) signal selector means responsive to said first control signal for passing said data-unavailability indicative signal and responsive to said second control signal for sequentially passing said data signals fed thereto from said arithmetic means; and
    (h) display means responsive to each signal applied thereto from said signal selector means for displaying the content represented by the signal.

2. In a navigation instrument, for use with a roadway vehicle for calculating and displaying vehicle running conditions with respect to scheduled ones of the type which include a pulse generator providing a pulse each time the vehicle travels a constant distance; a first counter counting the pulses from the pulse generator; a clock pulse generator generating clock pulses; a second counter counting the clock pulses from the clock pulse generator; arithmetic means for calculating the average speed of the vehicle, the deviation of the travelling distance from a scheduled distance, and the deviation of the travelling time from a scheduled time in accordance with the contents of the first and second counters and a scheduled average speed; and a display control circuit responsive to the calculated results of said arithmetic means for driving a display unit for displaying said results, the improvement comprising:

signal generating means for generating a data unavailability signal until the vehicle travels a predetermined distance from a starting point; and data unavailability indicating means responsive to said signal generating means and cooperating with said display control circuit for displaying an indication that said data unavailability signal is being generated.

3. The navigation instrument as set forth in claim 2 wherein said data unavailability indicating means cooperates with said display control circuit for displaying an indication that no data unavailability signal is being generated thereby indicating that the vehicle has travelled a predetermined distance.

4. The navigation instrument according to claim 2 wherein said pulse generator is a distance detector and said first counter comprises a control means to provide a first control signal before counting up to a predetermined value and a second control signal after counting up to said predetermined value.

5. The navigation instrument according to claim 4 wherein said first control signal enables said data unavailability indicating means for displaying the indication on the display unit that said data unavailability signal is being generated, thereby indicating that the vehicle has not travelled a predetermined distance.

6. The navigation instrument according to claim 4 or 5 wherein said second control signal enables said data unavailability indicating means for displaying the indication on the display unit that no data unavailability signal is being generated, thereby indicating that the vehicle has travelled a predetermined distance.

7. The navigation instrument according to claim 4 wherein said first counter periodically counts pulses from said pulse generator, a dividing circuit being located between said pulse generator and said first counter.

8. The navigation instrument as set forth in claim 2 wherein said clock pulse generator is a time detector and said second counter comprises a control means for counting pulses fed thereto from said clock pulse generator.

9. A navigation instrument according to claim 7 wherein said clock pulse generator comprises a time detector means and in which said control means further comprises a second counter for counting the pulses fed thereto from said clock pulse generator, and an OR gate for providing said first control signal before both of said first and second counters count up and said second control signal after at least one of said first and second counters counts up.

10. A navigation instrument according to claim 4 wherein said data unavailability indicating means includes a signal selector means for selecting a data unavailability signal from among at least two types of such signals, and wherein said signal generating means is adapted to provide a zero-flashing signal to said signal selector means to make a zero-flashing indication when said zero-flashing signal is applied through said signal selector means to said display means.

11. A navigation instrument according to claim 4 wherein said data unavailability indicating means includes a signal selector means for selecting a data unavailability signal from among at least two types of such signals, and wherein said signal generating means is adapted to provide a blanking signal to said signal selector means to make a blanking indication when said blanking signal is applied through said signal selector means to said display means.

12. A navigation instrument for use with a roadway vehicle, comprising:
(a) distance detector means for providing a signal representative of the distance of travel of the vehicle from a starting point;
(b) time detector means for providing a signal representative of the length of time it takes the vehicle to travel said distance;
(c) speed setting means for providing a signal representative of a scheduled average speed;
(d) arithmetic means responsive to said vehicle travelling distance representative signal, said time representative signal, and said scheduled average speed representative signal for providing data signals representative of the average speed of the vehicle, the deviation of travelling distance from a scheduled one, and the deviation of the travelling time from a scheduled one;
(e) signal generator means for providing a data-unavailability indicative signal;
(f) control means responsive to at least one vehicle running parameter for providing a first control signal when the value of the parameter is lower than a predetermined level and a second control signal when it is higher than the predetermined level;
(g) signal selector means responsive to said first control signal for passing said data-unavailability indicative signal and responsive to said second control signal for sequentially passing said data signals fed thereto from said arithmetic means; and
(h) display means responsive to each signal applied thereto from said signal selector means for displaying the content represented by the signal.

13. The navigation instrument as set forth in claim 12 wherein said vehicle running parameter is the vehicle travelling distance.

14. A navigation instrument according to claim 1, 12 or 13, in which said distance detector means comprises a pulse generator for providing a pulse every time the vehicle travels a constant distance and in which said control means comprises a first counter for counting the pulses fed thereto from said pulse generator to provide said first control signal before counting up and said second control signal after counting up.

15. A navigation instrument according to claim 14, in which said control means further comprises a dividing circuit interposed between said pulse generator and said counter for counting down the pulses fed thereto from said pulse generator.

16. A navigation instrument according to claim 14, in which said time detector means comprises a clock pulse generator and in which said control means further comprises a second counter for counting the pulses fed thereto from said clock pulse generator, and an OR gate for providing said first control signal before both of said first and second counters up and said second control signal after at least one of said first and second counters counts up.

17. A navigation instrument according to claim 1, 12 or 13, in which said generator means is adapted to provide a zero-flashing signal to said signal selector means so as to make a zero-flashing indication when said zero-flashing signal is applied through said signal selector means to said display means.

18. A navigation instrument according to claim 1, 12 or 13, in which said generator means is adapted to provide a blanking signal to said signal selector means so as to make a blanking indication when said blanking signal is applied through said signal selector means to said display means.

* * * * *